(12) United States Patent
Zeng

(10) Patent No.: US 9,433,856 B2
(45) Date of Patent: Sep. 6, 2016

(54) METHODS FOR SYNTHESIZING A VOICE GUIDING SIGNAL TO A GAMING CONTROLLER AND DEVICES THEREOF

(71) Applicant: Infosys Limited, Bangalore (IN)

(72) Inventor: Ganwen Zeng, Bothell, WA (US)

(73) Assignee: Infosys Limited, Bangalore (IN)

( * ) Notice: Subject to any disclaimer, the term of this patent is extended or adjusted under 35 U.S.C. 154(b) by 372 days.

(21) Appl. No.: 14/057,913

(22) Filed: Oct. 18, 2013

(65) Prior Publication Data

US 2014/0121016 A1 May 1, 2014

(30) Foreign Application Priority Data

Oct. 26, 2012 (IN) .......................... 4464/CHE/2012

(51) Int. Cl.
*A63F 13/00* (2014.01)
*A63F 13/20* (2014.01)
*A63F 13/40* (2014.01)

(52) U.S. Cl.
CPC .............. *A63F 13/06* (2013.01); *A63F 13/10* (2013.01); *A63F 2300/6054* (2013.01); *A63F 2300/6063* (2013.01)

(58) Field of Classification Search
CPC ..................................................... A63F 13/06
See application file for complete search history.

(56) References Cited

U.S. PATENT DOCUMENTS

| 6,456,977 | B1 | 9/2002 | Wang | |
| 6,652,376 | B1* | 11/2003 | Yoshida | A63F 13/10 |
| | | | | 434/62 |
| 7,085,722 | B2 | 8/2006 | Luisi | |
| 7,233,904 | B2 | 6/2007 | Luisi | |
| 7,613,616 | B2 | 11/2009 | Luisi | |
| 7,744,451 | B2* | 6/2010 | Tipping | A63F 13/10 |
| | | | | 434/62 |
| 2003/0109310 | A1* | 6/2003 | Heaton | A63F 3/00157 |
| | | | | 463/42 |
| 2005/0181851 | A1* | 8/2005 | Amaitis | A63F 1/06 |
| | | | | 463/12 |
| 2007/0298874 | A1* | 12/2007 | Baerlocher | G07F 17/32 |
| | | | | 463/27 |
| 2010/0113116 | A1* | 5/2010 | Theis | A63F 13/10 |
| | | | | 463/7 |

* cited by examiner

*Primary Examiner* — Reginald Renwick
(74) *Attorney, Agent, or Firm* — LeClairRyan, a Professional Corporation

(57) ABSTRACT

A method and system for synthesizing a voice guiding signal to a gaming controller. An input gaming data to the gaming controller is collected by a console game agent. A set of game target profiles and a set of control signals are created from the input gaming data. A set of active game patterns are synthesized from the set of game target profiles and the set of control signals. An optimal gaming strategy is produced from the set of active game patterns. The optimal gaming strategy is then converted into the voice guiding signal for guiding the user on playing a game effectively on the gaming controller.

25 Claims, 4 Drawing Sheets

METHODS FOR SYNTHESIZING A VOICE GUIDING SIGNAL TO A GAMING CONTROLLER AND DEVICES THEREOF

This application claims the benefit of Indian Patent Application Filing No. 4464/CHE/2012, filed Oct. 26, 2012, which is hereby incorporated by reference in its entirety.

FIELD OF THE INVENTION

The present invention relates generally to electronic entertainments devices and methods. More specifically, the present invention relates to a method and system for guiding a user of a gaming controller by audio signals.

BACKGROUND

In the gaming environment, a user typically interacts with a gaming program through a manually controlled input device such as XBOX steering wheels, pedals, PS3 game controllers, XBOX game controllers and the like. Each gaming system has an inbuilt algorithm, which tracks the user control movements, and displays the output of the gaming program based on the control movements. In order to attain optimal output results, the user control movements, need to be optimized through manual practice and experience of the user. However, this could be time-consuming and error prone, as the user may not be able to generate similar optimal output results at all times.

Hence there is a need for a method and system, which can guide the user on optimal control movements, for winning the gaming program. Further, the method and system that provides a voice guiding signal to the user shall be beneficial in the gaming environment, where the user can operate the game controller on hearing the voice signals.

SUMMARY

While systems and methods are described herein by way of example and embodiments, those skilled in the art recognize that systems and methods for electronic financial transfers are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

Disclosed embodiments provide computer-implemented methods, systems, and computer-program products for synthesizing a voice guiding signal to a gaming controller.

Figure 1:
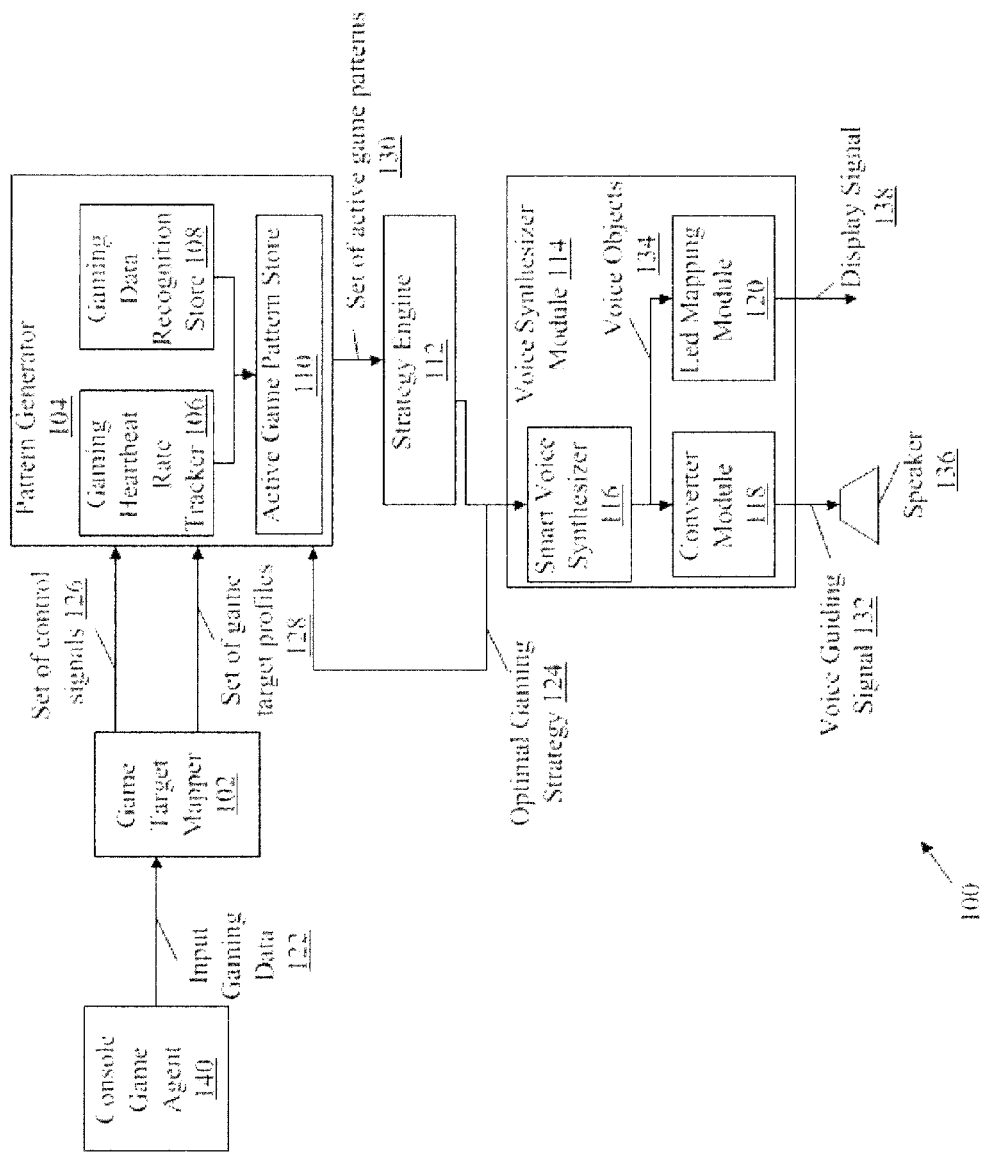
FIG. 1 shows an exemplary system for synthesizing a voice guiding signal to a gaming controller.

FIG. 1 illustrates an exemplary system 100 in which various embodiments of the invention can be practiced. The exemplary system 100 includes a console game agent 140, a game target mapper 102, a pattern generator 104, a strategy engine 112, and a voice synthesizer module 114. The pattern generator 104 includes a gaming heartbeat rate tracker 106, a gaming data recognition store 108, and an active game pattern store 110. The voice synthesizer module 114 includes a smart voice synthesizer 116, a converter module 118, and a led mapping module 120.

In an embodiment the console game agent 140 can be a software module in a game console of a gaming controller, configured to collect an input gaming data 122 inputted into the game console by a user of the gaming controller. The input gaming data 122 can include dynamic real-time results of a game being played by the user of the gaming controller, and score data achieved in the game. An implementation of the console game agent 140 shall depend on a type of the game console. In an instance where the game console is a XBOX machine, the console game agent 140 shall be XBOX software implementation, and in another instance where the game console is a PS3 machine, the console game agent 140 shall be a PS3 software implementation. The console game agent 140 shall feed the input gaming data 122 and a plurality of controller control signals to the game target mapper 102. The input gaming data 122 shall be digitized by the game target mapper 102, to form a set of input signals. A set of game target profiles 128 and a set of control signals 126 can be created by the game target mapper 102, from the set of input signals and the plurality of controller control signals. In the disclosed embodiment, the game target mapper 102, can include a transformation matrix for transforming or mapping the input gaming data 122 to the set of game target profiles 128. An instance of a game target profile for a car racetrack game can be a real-time function that shall describe a set of desired moves required on the racetrack in terms of a position, velocity and acceleration of the car, where the position, the velocity and the acceleration can be functions of time, represented in Cartesian coordinates. The set of control signals 126 can be required for deciding the control action, such as a push on the accelerator button, required to be performed by the user for moving the car on the racetrack.

The set of control signals 126 and the set of game target profiles 128 shall be fed to the pattern generator 104, for generating a set of active game patterns 130. The pattern generator 104 can include an optimal gaming recognition algorithm, which can generate a game data recognition store 108 and a game heartbeat rate tracker 106. The game heartbeat rate tracker 106 can be configured to categorize the set of input signals into one of a plurality of categories such as a good-level target-achievable category (C1), an above-average-level target-achievable category (C2), an average-level target-achievable category (C3), a not-effective-level category (C4), and an eliminated-level category (C5). Categorizing the set of input signals into the aforesaid categories shall be essential for providing the user with the voice guiding signal that can lead to an achievable target. For instance, if the set of input signals is categorized into the C5 category, then the Pattern Generator shall produce such set of active game patterns 130 that can guide the user to achieve at least the C4 category. Categorizing the signals into the aforementioned categories shall enable the user to reach an achievable target in the game. The set of active game patterns 130, can be stored in an active game pattern store 110, for future referencing. The set of active game patterns 130, as outputted by the pattern generator 104, shall be read by a strategy engine 112, configured to produce an optimal gaming strategy data 124 from the set of active game patterns 130. The strategy engine 112 shall include an optimal control algorithm that considers, a game history, a play behavior of the user and a current gaming control ability of the user, while producing the optimal gaming strategy data. The optimal gaming strategy data 124 shall usually contain a best game control pattern or a subsequent best gaming controlling move to be performed by the user. The optimal gaming strategy data 124, is usually provided as a feedback to the pattern generator 104, for updating the active game pattern store 110. Updating the active game pattern store 110 with the best game control pattern enables the pattern generator 104, to evaluate the effectiveness of an earlier outputted set of active game patterns 130, and thereby improvise a subsequent set of active game patterns 130.

Further, a voice synthesizer module 114 is configured to convert the optimal gaming strategy data 124 into the voice guiding signal 132, as required for mentoring the user towards winning the game being played. The voice synthesizer module 114 can include a smart voice synthesizer 116, configured to produce voice objects 134 from the optimal gaming strategy data 124, and a converter module 118, configured to convert the voice objects 134 into the voice guiding signal 132. A speaker 136, shall output the voice guiding signal 132 for the user to listen to the guidance being provided by the system for effectively playing the game. The voice synthesizer module 114 shall additionally contain a led mapping module 120, configured to convert the voice objects 134 into a display signal 138. The display signal 138 shall reflect the category to which the best game control pattern, the best game control pattern being embedded in the voice objects 134, belongs. The category to which the outputted best game control pattern belongs to shall provide the user visual information of a heartbeat rate of the game. For instance, if the display signal blinks a light mapping to the above-average-level target-achievable (C2) category, it shall indicate that user is currently playing in an average-level target-achievable category (C3) and the gaming controller is mentoring the user to achieve a level that is above the average level. A healthy heartbeat rate shall usually blink the good-level target-achievable category (C1) and it shall signify that the user has been successfully playing the game.

Figure 2:
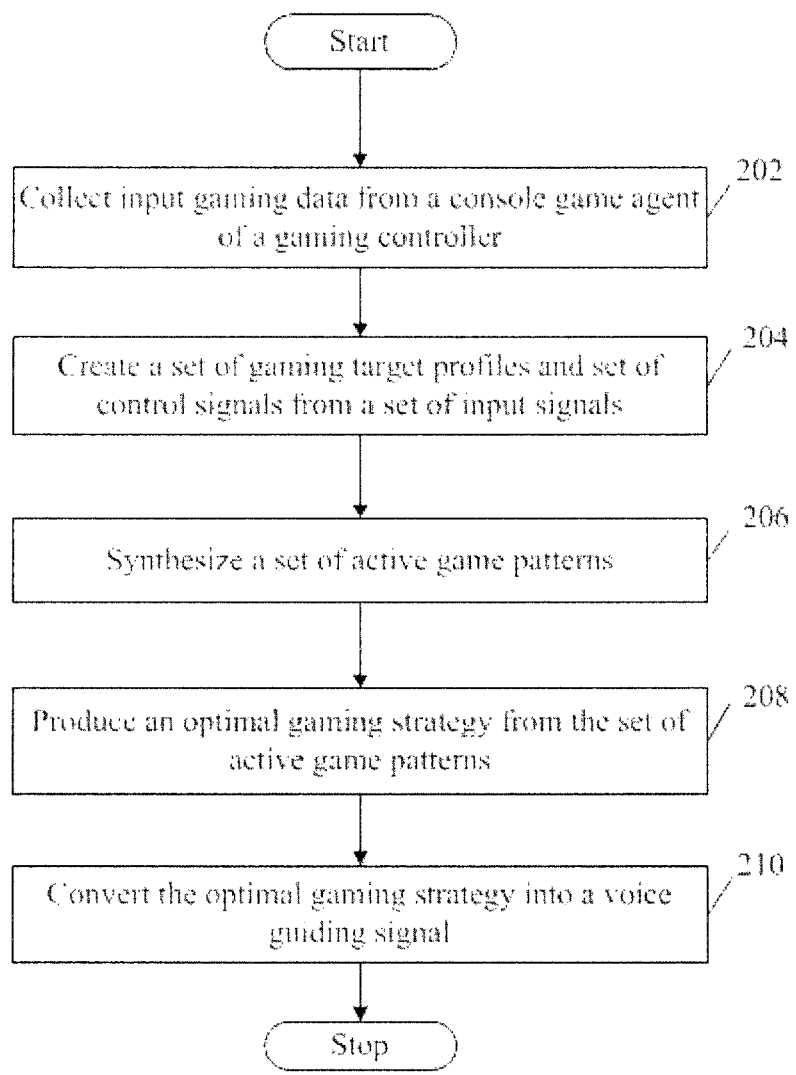
FIG. 2 is a flowchart illustrating an embodiment of a method of synthesizing a voice guiding signal to a gaming controller.

FIG. 2 is a flowchart that illustrates a method performed for synthesizing a voice guiding signal to a gaming controller in accordance with an embodiment of the present invention. At step 202, an input gaming data, as inputted by a user playing a game on the gaming controller, can be collected by a console game agent of the gaming controller. A console game software installed in the console game agent may be configured to collect the input gaming data. At step 204, a set of gaming target profiles, and a set of control signals shall be generated, by a game target mapper, using a set of input signals, where the set of input signals can be obtained by digitizing and normalizing the input gaming data. The set of gaming target profiles shall be generated by a transformation matrix present in the game target mapper. The set of gaming target profiles shall be specific to the game being played. An instance of a game target profile for a car racetrack game can be a real-time function that shall describe a set of desired moves required on the racetrack in terms of a position, velocity and acceleration of the car, where the position, the velocity and the acceleration can be functions of time, represented in Cartesian coordinates. The set of control signals can be required for deciding the control action, such as a push on the accelerator button, required to be performed by the user for moving the car on the racetrack. Further, at step 206, a set of active game patterns can be synthesized, by a pattern generator, from the set of control signals and the set of game target profiles. At step 208, a strategy engine, uses an optimal control algorithm on the set of active game patterns, to produce an optimal gaming strategy. At step 210 the optimal gaming strategy is converted by a voice synthesizer module into a voice guiding signal. The voice guiding signal shall guide the user on the best gaming control pattern to follow or the next best gaming move to perform for achieving a target in the game.

Figure 3:
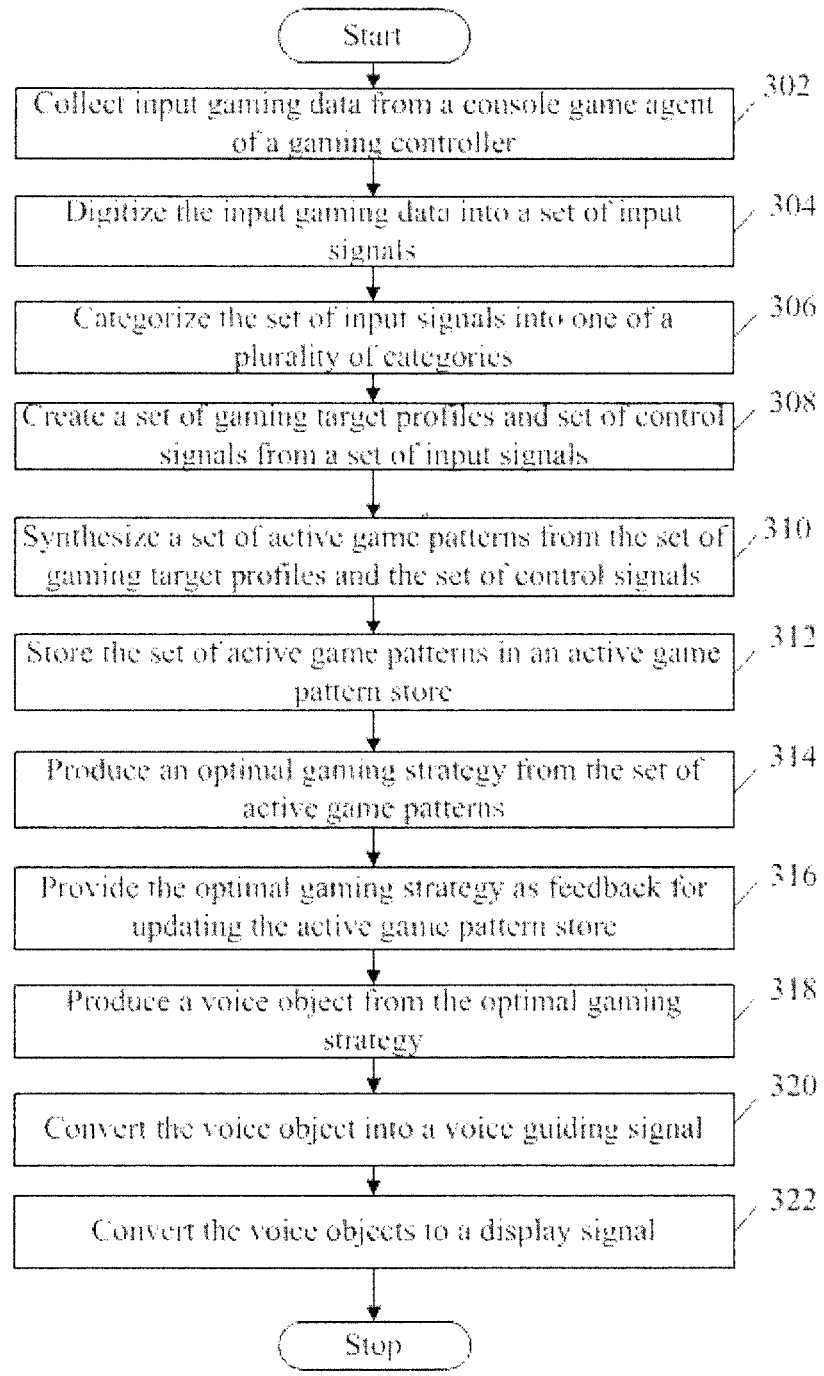
FIG. 3 is a flowchart illustrating a preferred embodiment of a method of for synthesizing a voice guiding signal to a gaming controller.

FIG. 3 illustrates an alternate embodiment of a method of practicing the instant invention. At step 302 an input gaming data, as entered by a user playing a game on a game controller, is collected by a console game agent. A game software may be installed in the console game agent for a purpose of collecting the entered input gaming data. At step 304, the input gaming data is digitized and normalized into a set of input signals, for further processing within the gaming controller. The set of input signals are categorized into one of a plurality of categories such as a good-level target-achievable category (C1), an above-average-level target-achievable category (C2), an average-level target-achievable category (C3), a not-effective-level category (C4), and an eliminated-level category (C5), at step 306. Categorizing the set of input signals into the aforesaid categories shall be essential for providing the user with a voice guiding signal that can enable the user to reach an achievable target in the game. At step 308, a set of gaming target profiles and a set of control signals are created from the set of input signals. The set of gaming target profiles and the set of control signals are fed as input to a pattern generator at step 310, for synthesizing a set of active game patterns. The set of active game patterns may be stored in an active game pattern store at step 312. At step 314, an optimal gaming strategy is created from the set of active game patterns, by a strategy engine deployed within the game controller. A voice synthesizer module may be configured to convert the optimal gaming strategy into a voice object at step 318. The voice objects can then be converted into the voice guiding signal at step 320. Additionally at step 322, the voice objects may be converted into a display signal, signifying the category into which the optimal gaming strategy belongs to. The display signal shall basically, signify the heartbeat rate of the gaming strategy or the category to which the best game control pattern, suggested to the user belongs to.

Figure 4:
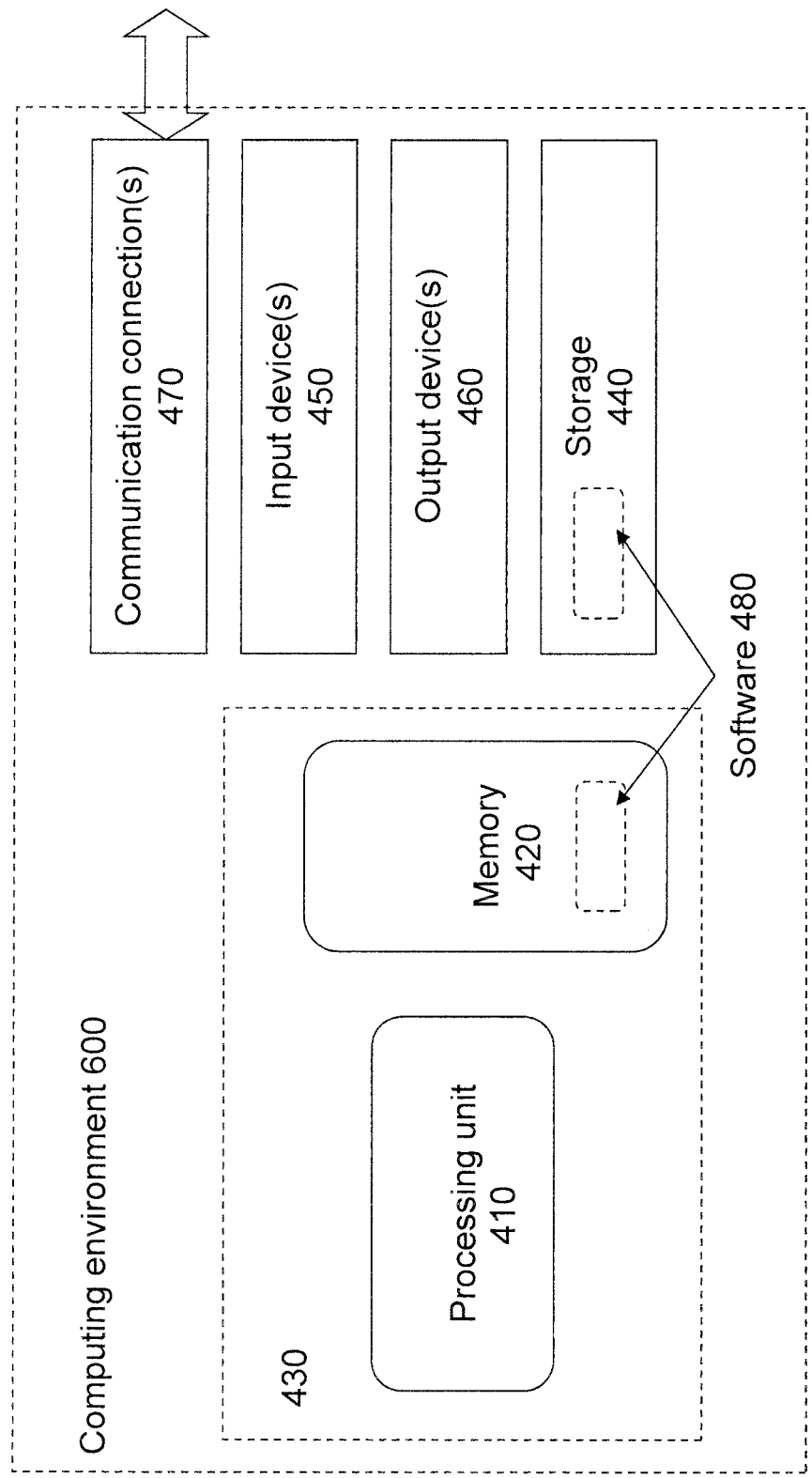
FIG. 4 illustrates a generalized example of a computing environment 400.

One or more of the above-described techniques can be implemented in or involve one or more computer systems. FIG. 4 illustrates a generalized example of a computing environment 400. The computing environment 400 is not intended to suggest any limitation as to scope of use or functionality of described embodiments.

With reference to FIG. 4, the computing environment 400 includes at least one processing unit 410 and memory 420. In FIG. 4, this most basic configuration 430 is included within a dashed line. The processing unit 410 executes computer-executable instructions and may be a real or a virtual processor. In a multi-processing system, multiple processing units execute computer-executable instructions to increase processing power. The memory 420 may be volatile memory (e.g., registers, cache, RAM), non-volatile memory (e.g., ROM, EEPROM, flash memory, etc.), or some combination of the two. In some embodiments, the memory 420 stores software 480 implementing described techniques.

A computing environment may have additional features. For example, the computing environment 400 includes storage 440, one or more input devices 440, one or more output devices 460, and one or more communication connections 470. An interconnection mechanism (not shown) such as a bus, controller, or network interconnects the components of the computing environment 400. Typically, operating system software (not shown) provides an operating environment for other software executing in the computing environment 400, and coordinates activities of the components of the computing environment 400.

The storage 440 may be removable or non-removable, and includes magnetic disks, magnetic tapes or cassettes, CD-ROMs, CD-RWs, DVDs, or any other medium which can be used to store information and which can be accessed within the computing environment 400. In some embodiments, the storage 440 stores instructions for the software 480.

The input device(s) 450 may be a touch input device such as a keyboard, mouse, pen, trackball, touch screen, a voice input device, a scanning device, a digital camera, or another device that provides input to the computing environment 400. The output device(s) 460 may be a display, printer, speaker, or another device that provides output from the computing environment 400.

The communication connection(s) 470 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 400, computer-readable media include memory 420, storage 440, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

While the foregoing has described certain embodiments and the best mode of practicing the invention, it is understood that various implementations, modifications and examples of the subject matter disclosed herein may be made. It is intended by the following claims to cover the various implementations, modifications, and variations that may fall within the scope of the subject matter described.

I claim:

1. A system for synthesizing a voice guiding signal to a gaming controller, the system comprising:
   a processor coupled to a memory and configured to execute instructions stored in the memory comprising:
      collecting input gaming data from the gaming controller, wherein the input gaming data is dependent on a type of the game controller;
      creating a set of game target profiles and a set of control signals from a set of input signals that is based on the collected input gaming data;
      creating a set of active game patterns based on the set of game target profiles and the set of control signals;
      producing gaming strategy data from the set of active game patterns; and
      converting the gaming strategy data into the voice guiding signal.

2. The system of claim 1, wherein the input gaming data is associated with a game being played on the game controller.

3. The system of claim 1, wherein the input gaming data comprises a set of real time gaming results and a set of score data.

4. The system of claim 1, wherein the processor is further configured to execute instructions stored in the memory comprising digitizing the input gaming data into the set of input signals.

5. The system of claim 1, wherein the creating the set of active game target patterns further comprises a gaming data recognition algorithm, configured to generate a game data recognition store and a game heartbeat rate tracker from the set of game target profiles and the set of control signals.

6. The system of claim 5, wherein the set of active game patterns are produced from the game data recognition store and the game heartbeat rate tracker.

7. The system of claim 6, wherein the set of active game patterns are stored in an active game pattern store.

8. The system of claim 7, wherein the game heartbeat rate tracker is configured to categorize the set of input signals into one of a plurality of categories comprising:
a good-level target-achievable category;
an above-average-level target-achievable category;
an average-level target-achievable category;
a not-effective-level category; and
an eliminated-level category.

9. The system of claim 8, wherein the gaming strategy data comprises a game control pattern.

10. The system of claim 9, further comprising:
a speaker for outputting the voice guiding signal.

11. The system of claim 8, wherein the game control pattern is provided as a feedback input to the creating the set of active game target patterns for updating the active game pattern store.

12. The system of claim 11, wherein the converting the gaming strategy data into the voice guiding signal further comprises:
producing a voice object from the gaming strategy; and
converting the voice object into the voice guiding signal.

13. The system of claim 12, wherein the converting the gaming strategy data into the voice guiding signal further comprises converting the voice object to a display signal, whereby the display signal indicates one of the plurality of categories to which the game control pattern belongs.

14. A method for synthesizing a voice guiding signal to a gaming controller, the method comprising:
collecting, with a gaming computing device, input gaming data, from the gaming controller, wherein the input gaming data is dependent on a type of the game controller;
creating, with the gaming computing device, a gaming target profile and a set of control signals from a set of input signals that is based on the input gaming data;
synthesizing, with the gaming computing device, a set of active game patterns from the set of gaming target profiles and a set of control signals;
producing, with the gaming computing device, an gaming strategy from the set of active game patterns; and
converting, with the gaming computing device, the gaming strategy into the voice guiding signal.

15. The method of claim 14, wherein the voice guiding signal contains one or more audio commands, for guiding the user on a set of control movements on the gaming controller.

16. The method of claim 14, further comprising:
digitizing, with the gaming computing device, the input gaming data into the set of input signals; and
categorizing, with the gaming computing device, the set of input signals into one of a plurality of categories, whereby the plurality of categories comprise;
a good-level target-achievable category,
an above-average-level target-achievable category,
an average-level target-achievable category,
a not-effective-level category, and
an eliminated-level category.

17. The method of claim 14, wherein the step of converting the gaming strategy into the voice guiding signal comprises:
producing a voice object from the gaming strategy; and
converting the voice object into the voice guiding signal.

18. The method of claim 17, wherein the input gaming data comprises a set of real time gaming results and a set of score data.

19. The method of claim 18, further comprising generating, with the gaming computing device, a gaming data recognition store and a gaming heartbeat rate tracker from the set of gaming target profiles and a set of control signals.

20. The method of claim 19, wherein the set of active game patterns are produced from the game data recognition store and the game heartbeat rate tracker.

21. The method of claim 20, wherein the set of active game patterns are stored in an active game pattern store.

22. The method of claim 21, wherein the gaming strategy data comprises a game control pattern.

23. The method of claim 22, wherein the game control pattern is provided as a feedback input for updating the active game pattern store.

24. The method of claim 20, further comprising converting, with the gaming computing device, the voice object to a display signal, whereby the display signal indicates one of the plurality of categories to which the control pattern belongs.

25. A non-transitory computer readable medium having stored thereon instructions for synthesizing an voice guiding signal to a gaming controller comprising machine executable code which when executed by a processor, causes the processor to perform steps comprising:
collecting gaming data from a gaming controller, wherein the gaming data is dependent on a type of the game controller;
creating a gaming target profile and a set of control signals from a set of input signals that is based on the input gaming data;
synthesizing a set of active game patterns from the set of gaming target profiles and a set of control signals;
producing a gaming strategy from the set of active game patterns; and
converting the gaming strategy into the voice guiding signal.

* * * * *